US009206084B2

(12) United States Patent
Matula et al.

(10) Patent No.: US 9,206,084 B2
(45) Date of Patent: *Dec. 8, 2015

(54) COMPOSITION AND METHOD FOR DISSIPATING HEAT UNDERGROUND

(75) Inventors: Gary W. Matula, Houston, TX (US); Toby N. McClain, Kingwood, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/430,229

(22) Filed: Mar. 26, 2012

(65) Prior Publication Data

US 2012/0184468 A1    Jul. 19, 2012

Related U.S. Application Data

(60) Continuation-in-part of application No. 10/767,690, filed on Jan. 29, 2004, now Pat. No. 7,067,004, and a division of application No. 11/099,023, filed on Apr. 5, 2005, now abandoned.

(51) Int. Cl.
| | |
|---|---|
| C04B 7/00 | (2006.01) |
| C04B 12/00 | (2006.01) |
| C04B 16/00 | (2006.01) |
| C04B 28/18 | (2006.01) |
| H01B 1/18 | (2006.01) |
| C09K 5/08 | (2006.01) |
| C09K 5/18 | (2006.01) |
| C09K 5/16 | (2006.01) |
| C09K 5/10 | (2006.01) |
| H01B 1/04 | (2006.01) |
| C09K 5/00 | (2006.01) |
| C09K 8/05 | (2006.01) |
| C09K 8/467 | (2006.01) |
| F24J 3/08 | (2006.01) |

(52) U.S. Cl.
CPC .............. *C04B 28/184* (2013.01); *C09K 5/00* (2013.01); *C09K 5/08* (2013.01); *C09K 5/10* (2013.01); *C09K 5/16* (2013.01); *C09K 5/18* (2013.01); *C09K 8/05* (2013.01); *C09K 8/467* (2013.01); *F24J 3/08* (2013.01); *H01B 1/04* (2013.01); *H01B 1/18* (2013.01); *Y02E 10/10* (2013.01)

(58) Field of Classification Search
USPC ........... 106/803, 805, 806, 809, 812, DIG. 4; 507/100, 103, 106, 107, 108, 119, 128, 507/142, 143; 166/293, 302; 405/266, 267; 252/70

See application file for complete search history.

(56) References Cited

U.S. PATENT DOCUMENTS

| | | | |
|---|---|---|---|
| 2,553,654 A | | 5/1951 | Heise |
| 3,137,347 A | | 6/1964 | Parker |
| 3,180,748 A | | 4/1965 | Holmgren et al. |
| 3,573,427 A | | 4/1971 | Minsk |
| 3,725,669 A | | 4/1973 | Tatum |
| 3,941,918 A | | 3/1976 | Nigol et al. |
| 3,962,142 A | | 6/1976 | Freeman et al. |
| 4,050,950 A | | 9/1977 | Brewer et al. |
| 4,088,583 A | * | 5/1978 | Pyle et al. ............ 507/102 |
| 4,177,078 A | | 12/1979 | Welna et al. |
| 4,291,008 A | | 9/1981 | Hsu et al. |
| 4,361,661 A | | 11/1982 | Jackson |
| 4,463,808 A | | 8/1984 | Mason et al. |
| 4,696,698 A | | 9/1987 | Harriett |
| 4,696,699 A | | 9/1987 | Harriett |
| 4,786,388 A | | 11/1988 | Tatum, Jr. |
| 4,797,158 A | | 1/1989 | Harriett |
| 4,806,272 A | | 2/1989 | Wiley |
| 4,866,550 A | | 9/1989 | Ohashi et al. |
| 4,886,118 A | | 12/1989 | Van Meurs et al. |
| 4,886,550 A | * | 12/1989 | Alexander ............ 106/811 |
| 4,948,428 A | | 8/1990 | Liao |
| 4,964,918 A | | 10/1990 | Brown et al. |
| 4,994,629 A | | 2/1991 | Tatum, Jr. |
| 5,026,508 A | | 6/1991 | Tatum, Jr. |
| 5,080,773 A | | 1/1992 | Tatum, Jr. |
| 5,226,961 A | * | 7/1993 | Nahm et al. ............ 106/692 |
| 5,389,146 A | | 2/1995 | Liao et al. |
| 5,401,719 A | | 3/1995 | DeBeer |
| 5,488,991 A | | 2/1996 | Cowan et al. |
| 5,826,669 A | | 10/1998 | Zaleski |
| 6,006,831 A | * | 12/1999 | Schlemmer et al. ..... 166/250.01 |

(Continued)

FOREIGN PATENT DOCUMENTS

| | | | |
|---|---|---|---|
| CA | 2 553 005 | * | 1/2005 |
| EP | 1 065 0451 A2 | | 1/2001 |
| WO | WO 95/14643 | | 6/1995 |

OTHER PUBLICATIONS

Sand—Definition and More from the Free Merriam-Webster Dictionary, Available at http://www.merriam-webster.com/dictionary/sand.

(Continued)

Primary Examiner — Elizabeth Wood
(74) Attorney, Agent, or Firm — Holly Soehnge; Baker Botts L.L.P.

(57) ABSTRACT

A substantially sand-free, aqueous-based, bentonitic fluid comprising flaked graphite can help dissipate heat from operation of electrical lines buried underground. The fluid is used in drilling a borehole, such as in trenchless drilling, or in making a trench, for receiving and containing the lines. The fluid may also be applied directly to the outside and/or to the inside of pipe containing electrical lines. Thermal conductivities having values of about 1.6 to about 1.8 BTU/hr ft° F. or higher can be attained.

7 Claims, No Drawings

(56) References Cited

U.S. PATENT DOCUMENTS

| | | | |
|---|---|---|---|
| 6,105,674 | A | 8/2000 | Liao et al. |
| 6,150,601 | A | 11/2000 | Schnatzmeyer et al. |
| 6,152,227 | A | 11/2000 | Lawson et al. |
| 6,208,265 | B1 | 3/2001 | Smith |
| 6,251,179 | B1 | 6/2001 | Allan |
| 6,258,160 | B1 | 7/2001 | Chatterji et al. |
| 6,315,062 | B1 | 11/2001 | Alft et al. |
| 6,395,199 | B1 | 5/2002 | Krassowski et al. |
| 6,461,424 | B1 | 10/2002 | Ramme |
| 6,502,636 | B2 | 1/2003 | Chatterji et al. |
| 6,644,891 | B2 | 11/2003 | Caslini et al. |
| 6,821,336 | B1 | 11/2004 | Ramme |
| 7,067,004 | B2 | 6/2006 | Matula |
| 7,452,417 | B2 * | 11/2008 | Matula et al. ........... C04B 28/10 106/638 |
| 2002/0056404 | A1 * | 5/2002 | Chatterji et al. ............. 106/705 |
| 2003/0085039 | A1 | 5/2003 | DiFoggio |
| 2003/0188666 | A1 | 10/2003 | Johnson, Jr. et al. |
| 2005/0166802 | A1 * | 8/2005 | Matula et al. .................. 106/803 |
| 2005/0205834 | A1 * | 9/2005 | Matula et al. ................... 252/71 |
| 2006/0243166 | A1 * | 11/2006 | Matula et al. ................. 106/638 |

OTHER PUBLICATIONS

Abstract of "Agglomeration of alumina sand in a fluidized bed straw gasifier at elevated temperatures," available at http://www.sciencedirect.com/science/article/pii/096085249390039E.

Abstract of "The effect of the particle size of alumina sand on the combustion and emission behavior of cedar pellets in a fluidized bed combustor," available at http://www.ncbi.nlm.nih.gov/pubmed/17869096.

Abstract of "Agglomeration characteristics of alumina sand-straw ash mixtures at elevated temperatures," available at http://www.sciencedirect.com/science/article/pii/0961953493900423.

* cited by examiner

COMPOSITION AND METHOD FOR DISSIPATING HEAT UNDERGROUND

RELATED APPLICATION

This application is a continuation-in-part of U.S. patent application Ser. No. 10/767,690, filed Jan. 29, 2004, and issued Jun. 27, 2006, as U.S. Pat. No. 7,067,004, and is a division of U.S. patent application Ser. No. 11/099,023, filed Apr. 5, 2005.

BACKGROUND OF THE INVENTION

1. Field of the Invention

This invention relates to fluids having high thermal conductivity or low thermal resistivity and their use underground. More particularly, this invention relates to products and methods for dissipating heat underground, particularly heat associated with buried high voltage power lines and other buried electrical transmission and distribution equipment such as cables.

2. Description of Relevant Art

Increasingly, electrical equipment such as high voltage transmission and distribution power lines are being installed (or buried) underground, for safety, ecological, aesthetic, and/or operational reasons. For example, the advantages of buried power lines in tropical regions, where above ground lines are vulnerable to high winds and rains due to tropical storms and hurricanes, are readily apparent. However, the capabilities of such installations are limited by the ability of the installations to dissipate heat generated by the flow of electrical power through the equipment. If the thermal resistivity of the environment surrounding the buried equipment is unsatisfactorily high, the heat generated during functioning of the equipment can cause an increase in the temperature of the equipment beyond tolerable limits resulting over time in the premature failure or destruction of the equipment.

Currently, the industry typically addresses dissipation of heat around buried power lines in one of two basic ways, both of which involve placing a thermally conductive material around the outside of power line cable (whether or not the cable is strung through a carrier pipe). One way uses bentonite grout to which sand may be added to increase thermal conductivity. The other way uses a cement or similar cementitious material containing sand to provide thermal enhancement. The thermally conductive material is typically installed by either digging a trench and backfilling around the cable with the thermally conductive material or by drilling a bore (hole) and then pulling the cable through the bore containing the thermal enhancement material.

Without sand, bentonite grout does not have high thermal conductivity properties. Typical thermal conductivity values for bentonite grouts range from about 0.4 to about 0.6 BTU/hr ft° F. The addition of sand of an appropriate size can increase such thermal conductivity to a range of about 1.0 to about 1.2 BTU/hr ft° F. However, the sand can cause placement problems and high pump pressures as the thermally conductive grout is placed. High pump pressures can lead to a "frac out" situation where the material induces fractures in the soil through which the material can break through to the surface. When the installation is being placed under a roadway, for example, such a "frac out" can cause a highly undesirable "hump" in the road surface. Use of cement grout can magnify such problems. Use of sand can also lead to excessive friction and problems associated therewith. For example, in the case of a pipe bundle containing cables, such friction from sand can result in pulling forces that can exceed the strength of the cable or pipe bundle causing the bundle to separate during installation. Backfilling soil with sand added after the pipe installation might be used to avoid such installation friction but backfilling may not always be possible or effective for the full length of the installation. Further, additional wear caused by the sand to pumps and pump parts remains a concern.

SUMMARY OF THE INVENTION

The present invention provides a product or composition that improves the thermal conductivity properties of the environment for buried or underground electrical equipment such as high voltage transmission and distribution power lines. The product comprises graphite, preferably flaked graphite, substantially free of sand, in a drilling fluid substantially free of sand and preferably having an aqueous, bentonitic base. The drilling fluid may further comprise a gellant which preferably will have characteristics or properties such that the fluid will remain pumpable above ground or until installed but will have enhanced viscosity underground and preferably will transform underground into a solid or semi-solid.

The present invention further provides methods for providing a thermally conductive environment for underground electrical equipment with the product of the invention and provides methods of installing electrical equipment using the product of the invention. The present invention also provides methods for enhancing the thermally conductive properties of existing grouts or fill materials. In one exemplary method of the invention, the thermal conductivity environment of underground electrical equipment is enhanced by positioning a product of the invention adjacent to the equipment.

Using the product of the invention in trenchless drilling of a borehole through which the equipment, particularly electrical lines or cable, are pulled, or otherwise using the product of the invention in preparing a trench to contain said equipment, imparts or provides a thermally conductive environment for the equipment. The product of the invention may additionally or alternatively be placed inside pipe for containing one or more electrical lines or cable and/or the product of the invention may be placed on the outside of pipe containing one or more electrical lines or cable. The product of the invention may also be placed directly between the underground soil and electrical lines or cable or other electrical equipment even when not encased in pipe, where the product of the invention will help dissipate heat from electrical current passing through the equipment to the soil. The product of the invention may also be used in backfilling trenches. The fluidity of the product of the invention facilitates such various placements of the product in proximity to the electrical equipment, placements not achievable with prior art backfill materials to the same degree of even-ness and consistency, if at all. The invention advantageously affords more efficient dissipation of heat away from the cable, thereby enabling more electricity to nm through the cable, and with lower heat which prolongs the cable life, than can be accomplished without the invention or with known prior art.

DETAILED DESCRIPTION OF PREFERRED EMBODIMENTS

In the present invention, a highly thermally conductive fluid (or a fluid having low resistivity) is placed around buried or underground electrical equipment, such as, for example, high voltage power lines, to dissipate heat given off by the equipment in operation. Such heat dissipation allows more efficient flow of electricity through the equipment. Further, such dissipation helps keep the heat within operational design limitations for the equipment and thus does not contribute to or cause excess wear of the equipment.

Any aqueous based drilling fluid suitable for trenchless drilling or for digging or excavating trenches is believed suitable for use as the base of the fluid product of the invention, provided the drilling fluid is capable of suspending flaked graphite and preferably is capable of gelling to a consistency ranging from that commonly found in pudding to that commonly found in peanut butter. Aqueous bentonitic drilling fluids are most preferred. Also preferably the drilling fluid base and the fluid product of the invention will not contain compounds that provide high resistivity or low thermal conductivity characteristics to the fluid. The fluid product should be pumpable and substantially free of sand. Silica flour, preferably about 200 mesh material, may be added as filler to contribute to the final set of the product and as supplemental thermal enhancement material. Silica flour may also assist in achieving low hydraulic conductivity. Such silica flour lacks the abrasiveness and density of sand and thus affords utility in a drilling fluid not practicable with sand. Graphite is added to the fluid to improve the fluid's thermal conductivity properties. Preferably the graphite is flaked. The specific amount of graphite added dictates the amount or degree of the resulting thermally conductive properties, and such relationship affords significant flexibility to the fluid. For example, to achieve a thermal conductivity of about 1.0 BTU/hr-ft.° F., about 145 pounds of flaked graphite per 100 gallons of aqueous drilling fluid would typically be needed. However, thermal conductivities of about 1.6 to about 1.7 BTU/hr ft ° F. or higher are achievable when adding flaked graphite to aqueous drilling fluid. The graphite may be added to aqueous fluid already prepared or being used for drilling in the field, or the fluid may be originally prepared to include the graphite.

The fluid should remain pumpable upon addition of the graphite and under subterranean conditions, at least for a time sufficient to allow or to facilitate placement of the fluid in the borehole being drilled or the trench being dug or filled or in a pipe being filled. The fluid may optionally comprise a gellant or equivalent component(s) to turn the fluid into a semi-solid or solid following such placement.

To fully appreciate the benefits of the invention, the fluid product of the invention is placed adjacent or proximate to the electrical equipment and preferably between the equipment and the soil covering or burying the equipment for dissipation of heat from the equipment during operation or use of the equipment. When the equipment comprises power lines, the lines may be encased in pipe or not, as the invention is effective in providing a thermally conductive environment in either situation.

According to one method of the invention, electrical equipment is installed by trenchless drilling, wherein a hole for receiving the equipment is drilled employing the fluid product of the invention. The fluid product of the invention may be used in drilling all or a portion of the hole. In one embodiment, a typical or traditional bentonitic drilling fluid may be used for drilling a horizontal borehole and just prior to pulling pipe and/or cable into the bore, the bentonitic drilling fluid is either replaced with the fluid of the invention or effectively made into the drilling fluid of the present invention by adding graphite thereto. During and after such drilling with the fluid of the invention, at least some of said fluid and particularly some graphite in said fluid deposits on the sides of said borehole and/or otherwise remains in said borehole. The electrical equipment, one or more high voltage power lines for example, is pulled through the borehole for positioning underground. The graphite provides an additional benefit of some lubrication for said pulling or installation of the electrical equipment. The amount of graphite included in the fluid depends on the thermal conductivity (resistivity) desired, as discussed above. Optionally, the fluid product of the invention remaining in the borehole may increase in viscosity, and may also harden, or transform to a solid or semi-solid.

During another method of the invention, electrical equipment is installed by drilling or excavating a trench, positioning the equipment in the trench, and then covering the equipment and/or backfilling the trench with soil. In this method, the fluid product of the invention may be used as a drilling fluid in excavating the trench and/or may be flowed in the trench after it is dug and preferably before the equipment is positioned in the trench. Additionally, or alternatively, the product of the invention may be added to the soil for use in the backfilling of the trench (after the equipment is positioned in the trench). Thus, in at least one such point in the installation, the fluid product of the invention is included so that it is adjacent to the equipment to facilitate dissipation of heat during use of the equipment.

In another method of the invention, the fluid product of the invention is flowed into and/or through the inside or interior of a protective covering for the equipment, such as inside pipe encasing power lines or cable for example, preferably before the pipe is installed underground. During such flow, at least some of said fluid and particularly some graphite in said fluid deposits on the sides of said equipment and/or protective covering of said equipment. Preferably, the underground installation of the equipment will be conducted by trenchless drilling using the fluid product of the invention.

Experimental

Laboratory tests were conducted to test and demonstrate the invention. In the tests, thermal conductivity was measured using the Baroid IDP Thermal Conductivity Meter available from Baroid Fluid Services, a Halliburton Company, in Houston, Tex. Examples of the ability of flaked graphite additions to increase the thermal conductivity of a base slurry containing varying amounts of graphite follow in Table I.

TABLE I

| AQUEOUS BENTONITE FLUID | THERMAL CONDUCTIVITY |
|---|---|
| Base without flaked graphite | TC-0.4 BTU/hr ft ° F. |
| Base with 130 lb flaked graphite/100 gal | TC-0.8 BTU/hr ft ° F. |
| Base with 145 lb flaked graphite/100 gal | TC-0.95 BTU/hr ft ° F. |
| Premixed with 35% solids | TC-0.9 BTU/hr ft ° F. |
| Premixed with 40% solids | TC-1.3 BTU/hr ft ° F. |
| Premixed with 45% solids | TC-1.6 BTU/hr ft ° F. |

The solids used in some of the test fluids were solids of the type used in "one sack" grout products as taught in U.S. patent application Ser. No. 10/767,690, filed Jan. 29, 2004, entitled, "Grout Compositions Having High Thermal Conductivities and Methods of Using the Same" by Gary W. Matula, Toby N. McClain and Paul K. Chaney.

The foregoing description of the invention is intended to be a description of preferred embodiments. Various changes in the details of the described fluids compositions of matter and methods of use can be made without departing from the intended scope of this invention as defined by the appended claims.

What is claimed is:

1. A fluid for providing a thermally conductive environment to electrical equipment underground, wherein to dissipate heat given off by the equipment in operation said fluid comprises:

a pumpable, substantially sand free aqueous base; and
at least about 145 pounds of flaked graphite per 100 gallons of aqueous base;
wherein said graphite is suspended in said aqueous base during pumping.

2. The fluid of claim 1 wherein the fluid comprises additional flaked graphite in an amount sufficient to impart to said environment a thermal conductivity of at least about 1.6 Btu/hr-ft° F.

3. The fluid of claim 1 further comprising a gellant to transform the fluid into a solid or semi-solid underground.

4. The fluid of claim 1 wherein said aqueous base is bentonitic.

5. A fluid for providing a thermally conductive environment to electrical equipment underground, wherein to dissipate heat given off by the equipment in operation, said fluid consists essentially of:
a substantially sand free aqueous bentonitic base; and
at least 145 pounds of flaked graphite per 100 gallons of the aqueous bentonitic base;
such that the fluid imparts to the environment a thermal conductivity of at least about 1.0 Btu/hr-ft° F.

6. The fluid of claim 5 further comprising a gellant to transform the fluid into a solid or semi-solid underground.

7. The fluid of claim 5 wherein the fluid comprises additional flaked graphite in an amount sufficient to impart to said environment a thermal conductivity of at least about 1.6 Btu/hr-ft° F.

* * * * *